(12) United States Patent
Wilson (10) Patent No.: US 9,789,988 B2
(45) Date of Patent: Oct. 17, 2017

(54) SQUEEZABLE LEAK PROOF FEEDING BOTTLE (71) Applicant: Kiley Steven Wilson, Paso Robles, CA (US)

(72) Inventor: Kiley Steven Wilson, Paso Robles, CA (US)

( * ) Notice: Subject to any disclaimer, the term of this patent is extended or adjusted under 35 U.S.C. 154(b) by 0 days.

(21) Appl. No.: 14/685,441

(22) Filed: Apr. 13, 2015

(65) Prior Publication Data
US 2015/0217911 A1 Aug. 6, 2015

Related U.S. Application Data (63) Continuation-in-part of application No. 29/476,683, filed on Dec. 16, 2013, now Pat. No. Des. 703,533.

(51) Int. Cl.
*A61J 9/00* (2006.01)
*B65B 61/18* (2006.01)
*A61J 11/00* (2006.01)
*A61J 9/06* (2006.01)

(52) U.S. Cl.
CPC ............ *B65B 61/186* (2013.01); *A61J 9/005* (2013.01); *A61J 11/0085* (2013.01); *A61J 9/0646* (2015.05); *A61J 11/002* (2013.01); *A61J 11/0015* (2013.01); *A61J 2200/76* (2013.01)

(58) Field of Classification Search
CPC .. A61J 11/0015; A61J 11/002; A61J 11/0085; A61J 2200/60; A61J 9/005; A61J 9/0646; B65B 61/186; B65D 1/02; Y02W 30/807
See application file for complete search history.

(56) References Cited

U.S. PATENT DOCUMENTS

| 811,801 A | 2/1906 | Smith |
| 2,520,157 A * | 8/1950 | Little ...................... A61J 9/008 215/11.5 |
| 2,743,044 A | 4/1956 | Deemer et al. |
| | (Continued) | |

FOREIGN PATENT DOCUMENTS

| DE | 202004014944 | 3/2005 | |
| TW | DE 202012012139 U1 * | 1/2013 | ............ A61J 11/002 |
| WO | 2005004788 | 1/2005 | |

OTHER PUBLICATIONS

Amazon.com, Squooshi 4 Count Reusable Food Pouch, Large Panda/Walrus, 4.5 Ounce, http://www.amazon.com/squooshireusable-pouch-large-walrus-4-count/dp/b00awjhcdw/ref=sr_1_1?ie=UTF8&qid=1384457479&sr=8-1&keywords=squooshi-count-reusable-pouch-walrus; Published as early as May 24, 2013.
(Continued)

*Primary Examiner* — Frederick C Nicolas
*Assistant Examiner* — Bob Zadeh
(74) *Attorney, Agent, or Firm* — Stetina Brunda Garred and Brucker (57) ABSTRACT

A reusable food pouch having a removably insertable one-way valve is disclosed herein. The one-way valve may be used with the reusable food pouch if food product having a water-like consistency is being stored in the reusable food pouch to prevent spills if the reusable food pouch is inadvertently laid on its side. Conversely, the one-way valve may be removed from the reusable food pouch if the food product has a consistency more like thick oatmeal and/or applesauce to allow for free flow of the food product through a spout of the reusable food pouch.

12 Claims, 6 Drawing Sheets

(56) References Cited

U.S. PATENT DOCUMENTS

| | | | |
|---|---|---|---|
| 2,804,995 A | 9/1957 | Fee | |
| 3,157,314 A | 11/1964 | Nadler | |
| 3,219,220 A | 11/1965 | Hakim | |
| 3,488,002 A | 1/1970 | Francis | |
| D223,438 S | 4/1972 | Lluch | |
| D240,968 S | 8/1976 | Hurst | |
| 4,376,762 A | 3/1983 | Hauschild et al. | |
| 5,301,840 A | 4/1994 | Sun | |
| 5,339,995 A | 8/1994 | Brown et al. | |
| 5,758,802 A | 6/1998 | Wallays | |
| D413,067 S | 8/1999 | Haley | |
| 5,992,662 A | 11/1999 | Holt et al. | |
| 6,112,951 A | 9/2000 | Mueller | |
| 6,427,874 B2 | 8/2002 | Brown et al. | |
| 6,575,204 B1 | 6/2003 | Godfrey | |
| 6,672,479 B2 | 1/2004 | Shiraishi et al. | |
| 6,695,173 B1* | 2/2004 | Fontana | B65D 47/2068 |
| | | | 222/206 |
| 6,705,492 B2 | 3/2004 | Lowry | |
| 6,708,850 B2 | 3/2004 | Uetake et al. | |
| 6,994,225 B2* | 2/2006 | Hakim | A61J 11/0015 |
| | | | 215/11.1 |
| 7,207,467 B1 | 4/2007 | Raja | |
| D602,369 S | 10/2009 | Potts et al. | |
| D627,895 S | 11/2010 | Pheil et al. | |
| D628,078 S | 11/2010 | Valderrama et al. | |
| 7,959,036 B2 | 6/2011 | Koh | |
| D657,684 S | 4/2012 | Venkataraman et al. | |
| D660,174 S | 5/2012 | Schmertz et al. | |
| 8,602,237 B2 | 12/2013 | Wurster et al. | |
| D705,072 S | 5/2014 | Fedewa et al. | |
| D730,533 S | 5/2015 | Wilson | |
| 2002/0014499 A1 | 2/2002 | Bonningue | |
| 2004/0035815 A1* | 2/2004 | Webb | A47G 19/2272 |
| | | | 215/11.4 |
| 2005/0263475 A1* | 12/2005 | Carlson | A61J 9/06 |
| | | | 215/11.1 |
| 2006/0226109 A1* | 10/2006 | Ellegaard | A61J 9/001 |
| | | | 215/11.3 |
| 2006/0243756 A1 | 11/2006 | Kawakita | |
| 2006/0273059 A1* | 12/2006 | Mendenhall | A61J 9/00 |
| | | | 215/11.1 |
| 2007/0029352 A1 | 2/2007 | Norris et al. | |
| 2007/0056964 A1 | 3/2007 | Holcomb | |
| 2007/0114246 A1 | 5/2007 | Awbrey et al. | |
| 2007/0272711 A1 | 11/2007 | MacLeod et al. | |
| 2007/0295354 A1 | 12/2007 | Costa | |
| 2009/0242562 A1 | 10/2009 | Valderrama et al. | |
| 2009/0321377 A1* | 12/2009 | Pfenniger | A61J 11/0015 |
| | | | 215/11.4 |
| 2010/0230373 A1 | 9/2010 | Lo | |
| 2010/0252578 A1 | 10/2010 | Koh | |
| 2011/0248051 A1 | 10/2011 | Koh | |
| 2011/0284491 A1* | 11/2011 | Bryan | A61J 9/04 |
| | | | 215/11.4 |
| 2012/0043293 A1* | 2/2012 | Bryan | A61J 9/04 |
| | | | 215/11.1 |
| 2012/0097710 A1* | 4/2012 | Ahmer | A61J 9/005 |
| | | | 222/212 |
| 2012/0305582 A1 | 12/2012 | Dunn et al. | |
| 2013/0119008 A1* | 5/2013 | Pfenniger | A61J 11/0015 |
| | | | 215/11.5 |
| 2013/0306632 A1* | 11/2013 | Dunn | A61J 9/04 |
| | | | 220/203.19 |
| 2014/0107608 A1 | 4/2014 | McBean et al. | |
| 2015/0217911 A1* | 8/2015 | Wilson | B65B 61/186 |
| | | | 222/213 |

OTHER PUBLICATIONS

Amazon.com, Boon Squirt Baby Food Dispensing Spoon, http://www.amazon.com/Boon-Squirt-Dispensing-Spoon-Orange/dp/B000WEHO76/ref=sr_1_2?s=baby-products&ie=UTF8&qid=1384460473&sr=1-2&keywords=boon+squirt, Published as early as Nov. 14, 2013.

Amazon.com, Infantino Keeper Squeeze Pouch, http://www.amazon.com/Infantino-208-107-Keeper-Squeeze-Pouch/dp/B00B9ZHLRU/ref=sr_1_3?ie=UTF8&qid=1369177164&sr=8-3&keywords=Infantino+Squeeze, Published as early as May 23, 2013.

Amazon.com, Munchkin 4 Ounce Easy Squeezy Spoon, http://www.amazon.com/munchkin-ounce-squeezy-spoon-colors/dp/b004hmqpj2, Published as early as Nov. 14, 2013.

Beaba, Babypote, http://beabausa.com/products-categories/feeding/babypote/, Published as early as Nov. 14, 2013.

TheSiliCompany, Sili Squeeze, http://thesilico.com/products.html, Published as early as Nov. 14, 2013.

Enfant article, translation not available, Published as early as May 2004.

Best Baby article, translation not available, Published as early as May 2004.

Amazon.com, CUISIPRO Silicone Pastry Brush, https://www.amazon.com/Cuisipro-747148-Silicone-Brush/dp/B001RRHT9K, Published as early as Dec. 2, 2012.

Amazon.com, iSi "Squid" Brush and Baster, https://www.amazon.com/iSi-K8611-Silicone-Squid-Baster/dp/B0002JA1Y4/ref=cm_cr_arp_d_product_top?ie=UTF8, Published as early as Nov. 22, 2005.

* cited by examiner

SQUEEZABLE LEAK PROOF FEEDING BOTTLE

CROSS-REFERENCE TO RELATED APPLICATIONS

The present application is a continuation-in-part application of U.S. Design patent application. Ser. No. 29/476,683, filed on Dec. 16, 2013, the entire contents of which are incorporated herein by reference.

STATEMENT RE: FEDERALLY SPONSORED RESEARCH/DEVELOPMENT

Not Applicable

BACKGROUND

The various embodiments and aspects described herein relate to a reusable food pouch for containing fluidic food products that can be consumed through a spout.

Various reusable food pouches are currently marketed. However, these food pouches may be cumbersome to use and difficult to sanitize. For example, prior art reusable food pouches may have a flexible receptacle for holding the food product. A spout may be attached to the receptacle so that a toddler can suck the food product out of the receptacle when desired. The spout may be covered with a lid that stops fluid flow through the spout so that the user can store the food product within the reusable food pouch during the day and access the same and provide the same to the toddler when desired.

Unfortunately, these prior art reusable food pouches are cumbersome to use and difficult to sanitize.

BRIEF SUMMARY

A reusable food pouch is disclosed herein. The reusable food pouch may be completely disassembled so that all of the components of the reusable food pouch can be thoroughly cleaned and sanitized. Moreover, the reusable food pouch has a removably insertable one-way valve that can be inserted and used or removed depending on the viscosity of the food product being dispensed through the reusable food pouch. More particularly, if the food product has a water-like consistency, then the one-way valve may be inserted in the reusable food pouch to prevent spills if the reusable food pouch is laid on its side. If the food product has a consistency similar to thick oatmeal or applesauce, then the one-way valve may be removed and stored away to allow the toddler to easily suck the food product out of the spout and into his or her mouth.

More particularly, a container for holding flowable food product is disclosed. The container may comprise a deformable receptacle, a cover and a one way valve. The deformable receptacle may have a cavity for holding the flowable material. The receptacle may have a closed bottom and an opening at an upper end of the deformable receptacle. The cover may be attached to the deformable receptacle. The cover may have a reduced narrow spout for forcing the flowable food product out of the spout and into a mouth of a person. The one way valve may be disposed between the deformable receptacle and the cover or removed therefrom depending on a viscosity of the flowable food product. The one way valve is disposed between the receptacle and the cover for more viscous flowable food products and removed therefrom for less viscous flowable food products. Also, the one way valve may be disposed between the deformable receptacle and the cover for liquid food products and the one way valve may be removed from between the deformable receptacle and the cover for liquid food products with solid materials mixed with the liquid food products.

The cover may define an interior surface. The interior surface of the cover has a funnel shape that leads to the spout having a straight cylindrical configuration. The one way valve has an upper surface that may have a configuration identical to the interior surface of the cover.

The one way valve may have an outwardly protruding rib that engages the interior surface of the cover at the spout.

The cover may have a lid that engages with the spout to stop fluid flow through the spout when the lid is engaged to the spout and to allow fluid flow through the spout when the lid is disengaged from the spout.

The cover may have a downwardly protruding lip extending from the interior surface circumscribing the one way valve when the one way valve is seated on the interior surface of the cover.

The one way valve may have a lower surface and pull tab that extends below the lower surface in order to remove the one way valve from the cover when the one way valve is seated on the cover.

The one way valve may have a cross slit formed in a membrane.

In another aspect, a method of providing a flowable food product to a toddler is disclosed. The method may comprise the steps of providing a receptacle, a collar, a cover and a one way valve, the cover having a spout through which the toddler sucks out flowable food product disposed within the receptacle, the collar and cover capable of forming a seal with a flange portion of the receptacle so that a liquid tight seal is formed between the cover, flange portion of the receptacle and the collar; inserting the flange portion of the receptacle through the collar; filling the receptacle with a fluid having a viscosity about equal to a viscosity of water; disposing the one way valve between the flange portion of the receptacle and the cover so that the flowable food product does not flow out of the spout unless sidewalls of the receptacle are being compressed or suction is formed at the spout; and fastening the cover on the collar so as to compress the flange portion of the receptacle between the cover and the collar to form the seal with the flange portion.

In another aspect, a method of providing a flowable food product to a toddler is disclosed. The method may comprise the steps of providing a receptacle, a collar, a cover and a one way valve, the cover having a spout through which the toddler sucks out flowable food product disposed within the receptacle, the collar and cover capable of forming a seal with a flange portion of the receptacle so that a liquid tight seal is formed between the cover, flange portion of the receptacle and the collar; inserting the flange portion of the receptacle through the collar; filling the receptacle with a fluid having a viscosity about equal to a viscosity of a puree of vegetable and fruits; removing the one way valve between the flange portion of the receptacle and the cover so that the flowable food product does flow out of the spout without pressure on sidewalls of the receptacle; and fastening the cover on the collar so as to compress the flange portion of the receptacle between the cover and the collar to form the seal with the flange portion.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Referring now to the drawings, a reusable food pouch 10 is shown which can be used to feed a toddler a food product having a water-like liquid consistency (e.g., apple juice) or a somewhat more viscous consistency (e.g., applesauce). The reusable food pouch 10 has a removably insertable one-way valve 12 that when inserted provides a no spill functionality to the reusable food pouch 10 for water-like liquids and when removed provides free flow functionality to the reusable food pouch 10 for heavier consistency food products such as applesauce. The reusable food pouch 10 is capable of being disassembled and each component washed for reuse.

The reusable food pouch 10 has a deformable receptacle 14 which holds the food product therein. The deformable receptacle 14 is preferably fabricated from a silicone material but other materials are also contemplated. By way of example and not limitation, the receptacle 14 may be fabricated from an elastomeric material, plastic material, paper material and other materials that are known in the art or developed in the future. The receptacle 14 can be deformed as the toddler sucks on a spout 16 (see FIG. 4) to withdraw the food products from within the receptacle 14. By sucking on the spout 16, a vacuum is created within the receptacle 14 to withdraw the food product out of the receptacle 14 through the spout 16. As the food product is withdrawn out of the receptacle 14 and through the spout 16, the side walls 18 collapse inward. The receptacle 14 is deformable to an extent so that a majority of the food product within the receptacle 18 can be sucked out of the spout 16. Preferably, the reusable food pouch 10 allows for more than between about 50% to 95% removal of the food product from within the receptacle 14. In certain instances, the reusable food pouch 10 allows for 99% to 100% removal of the food product from within the receptacle 14.

Figure 2:
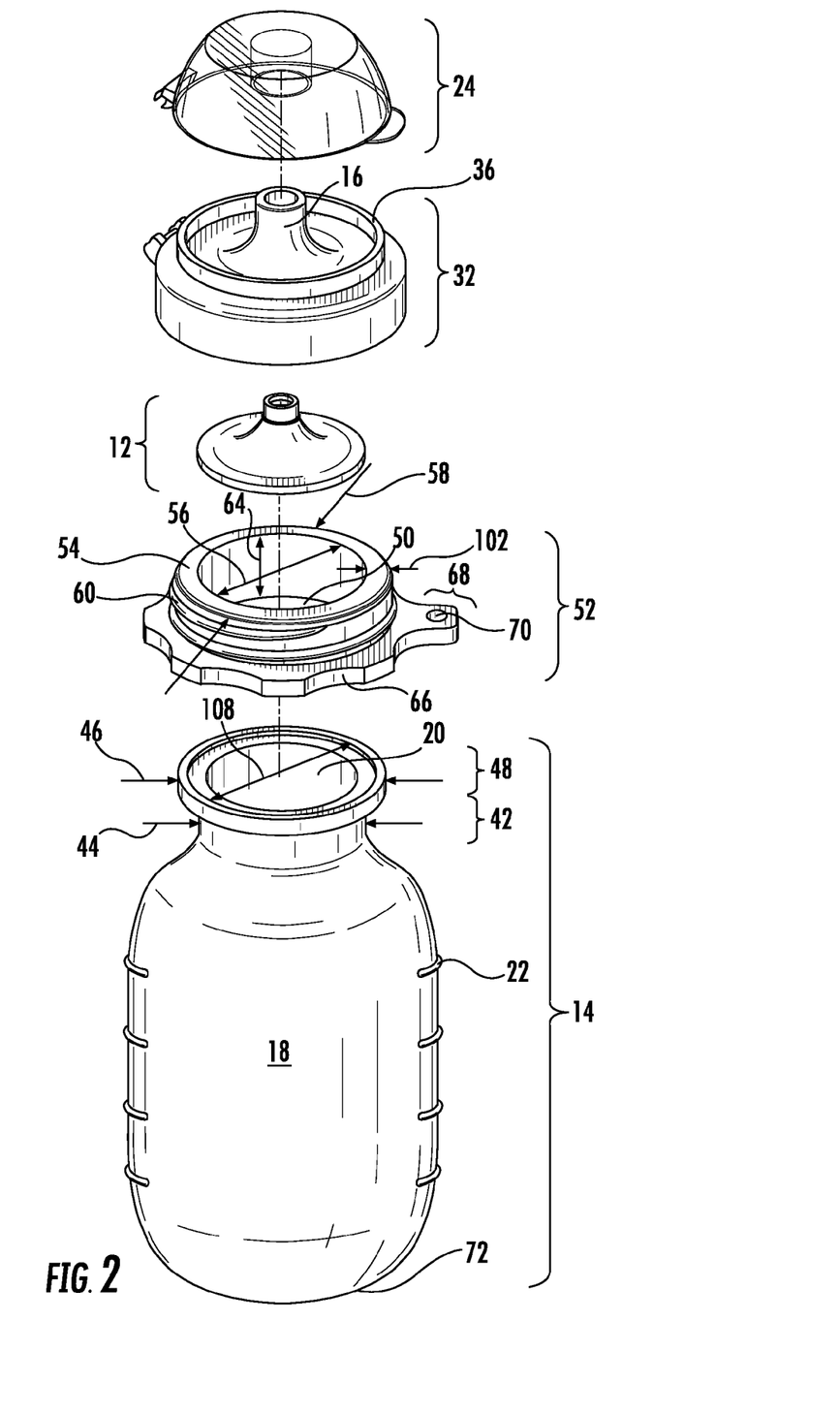
FIG. 2 is an exploded perspective view of the reusable food pouch shown in FIG. 1.
Figure 4:
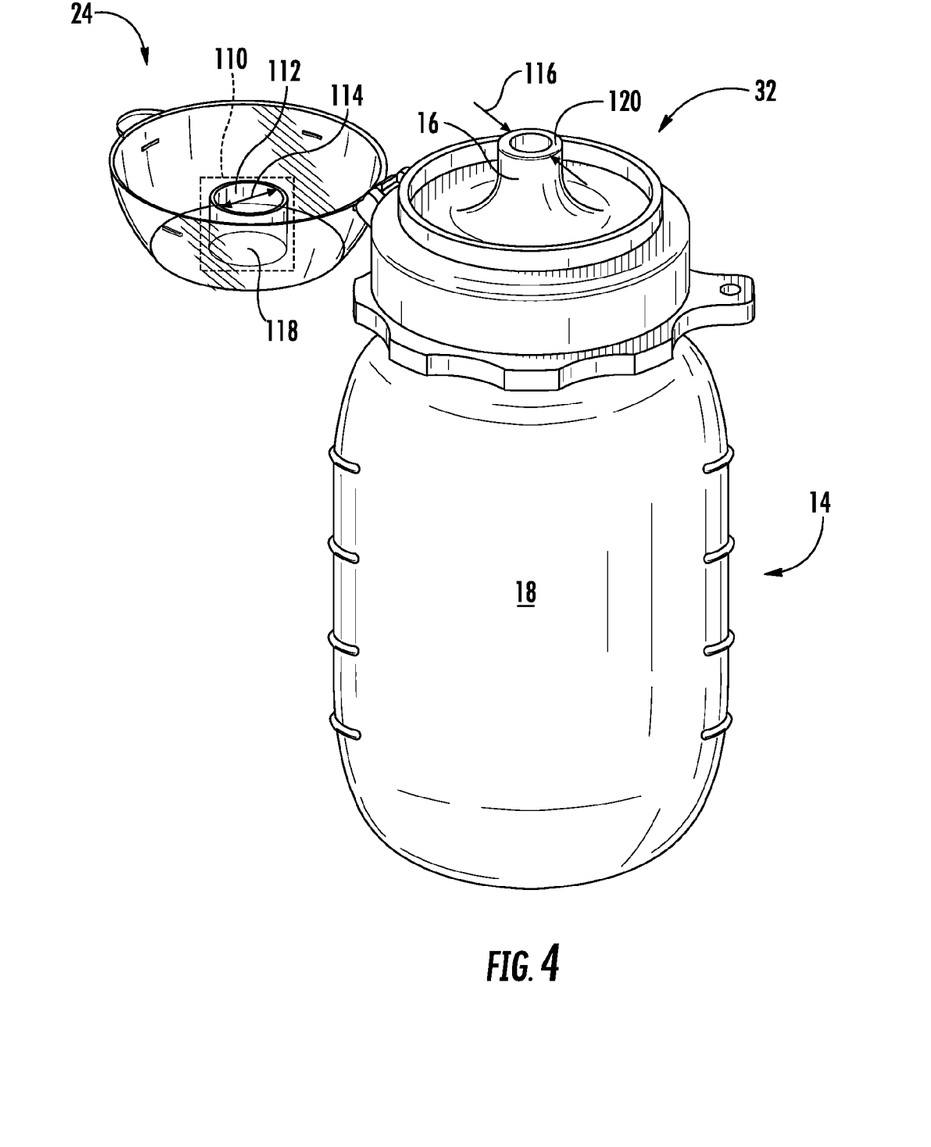
FIG. 4 is a perspective view of the reusable food pouch shown in FIG. 1 with the lid in the opened position and the side walls of the receptacle in a normal unbiased position.

After the food product is removed from the reusable food pouch 10, the receptacle 14 can be expanded back outward for refilling of the receptacle 14 and reuse of the reusable food pouch 10. The receptacle 14 can be expanded back outward either through the resiliency of the material from which the receptacle 14 is fabricated or by manual means. For example, if the receptacle 14 is fabricated from a silicone material, the physical characteristics of the silicone material may be designed so that its normal position is that as shown in FIG. 4. When food product is removed from the receptacle 14, the side walls 18 are now biased to be urged back outward. If the one-way valve 12 (see FIG. 2) is inserted in the reusable food pouch 10, air cannot reenter the receptacle 14 when the toddler removes his or her mouth from the spout 16. As such, the receptacle remains in the deformed or compressed position. When the toddler wants to consume more food product, the toddler can suck more food out of the spout 16 without having to suck air through the spout 16 until the food product reaches the spout 16. When the reusable food pouch 10 is being washed, the reusable food pouch 10 is disassembled and air is allowed to go back into the receptacle 14. In this instance, the side walls 18 may expand back outward due to the resiliency of the side walls 18 of the receptacle 14.

In contrast, if heavier consistency food is being disposed within the receptacle 14, the user may remove the one-way valve 12 for free flow of the heavier consistency food product through the spout 16. In this instance, the side walls 18 will extend back outward each time the toddler removes his or her mouth from the spout 16. To consume more food product from the receptacle 14, the toddler must initially squeeze the side walls 18 (see FIG. 3) until the food product reaches the spout 16 and squirt the food product through the spout 16 into the toddler's mouth. After the toddler has consumed all of the food product, the reusable food pouch 10 may be washed by disassembling the same. In doing so, the receptacle 14 may be fabricated from material that is resilient so that the side walls 18 of the receptacle 14 expand back outward.

Although the receptacle 14 has been described as being resilient in that the side walls 18 of the receptacle 14 expand back outward without human intervention, it is also contemplated that the receptacle 14 may be deformable but not resilient in that it is biased back outward through manual means or human intervention. In order to expand the side walls 18 of the receptacle 14, the user must apply pressure within the receptacle 14 to expand the side walls 18 back outward either through filling the receptacle 14 with water or physically inserting an object (e.g., finger or spoon) into an upper opening 20 of the receptacle 14 and spread out the sidewalls 18.

The receptacle 14 may also have graduation marks 22 to indicate an amount of fluid within the receptacle 14. By way of example and not limitation, when the side walls 18 of the receptacle 14 are not compressed, each graduation mark can represent one fluid ounce.

The receptacle 14 may also have a flat bottom 72 that is sufficiently rigid to allow the reusable food pouch 10 to be capable of being stood upright on a support surface.

All components of the reusable food pouch 10 may be fabricated from 100% food grade non-toxic materials that are BPA, PVC and PHTHALATE free.

Figure 3:
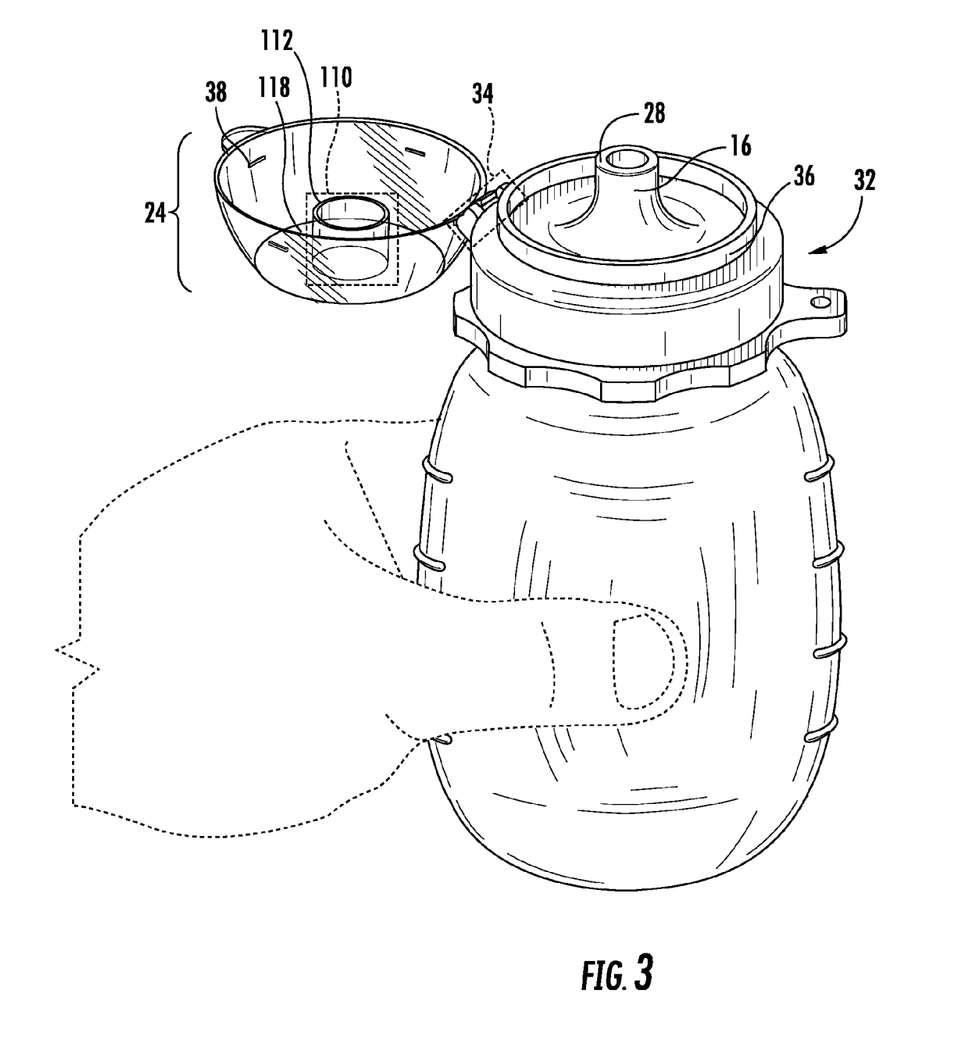
FIG. 3 is a perspective view of the reusable food pouch shown in FIG. 1 with a lid in an opened position and side walls of the receptacle being compressed.

The reusable food pouch 10 may have a lid 24 that can be traversed between the closed position (see FIG. 1) and an opened position (see FIG. 3). In the closed position, the lid 24 stops all fluid flow through the spout 16 so that the reusable food pouch 10 can be stored in a bag or other area that is jostled or handled. Inadvertent squeezing of the side walls 18 of the receptacle 14 will not cause the food product within the receptacle 14 to be squirted out of the spout 16. To this end, the lid 24 has a cylindrical sealing member 110 that is sized and configured to mate with the spout 16 when the lid 24 is in the closed position. The sealing member 26 forms a liquid tight seal around the spout 16 circumferentially and/or against an upper surface 28 of the spout 16 with the horizontal portion 18 of the lid 24.

The lid 24 is hinged to a cover 32 through a hinge mechanism 34. The cover 32 may have an upwardly directed flange 36 that circumscribes the spout 16. The upper end of the flange 36 may be flared outwardly and engage one or more inwardly directed protrusions 38 formed on the interior surface of the lid 24 in order to keep the lid 24 in the closed position. To traverse the lid 24 to the opened position, the user may press upward on a finger tab 40.

The receptacle 14 may have a neck portion 42 (see FIG. 2) which has an outer diameter 44 which is smaller than an outer diameter 46 of an outwardly directed flange portion 48. To assemble the reusable food pouch 10, the flange portion 48 is bent so as to be insertable through a through hole 50 of a collar 52. Once the flange portion 48 is inserted through the through hole 50 of collar 52, the flange portion 48 is expanded outward and rests on an upper surface 54 of the collar 52. The inner diameter 56 of the through hole 50 is about equal to the outer diameter 44 of the neck portion 42 of the receptacle 14. The outer diameter 58 of the collar 52 defined by the base of thread 60 is equal to about the outer diameter 48 of the flange portion 48 of the receptacle 14. As such, the flange portion 48 rests on the upper surface 54 of the collar 52. Also, the collar 52 does not deform the neck portion 42 of the flange portion 48 in that position. Preferably, the receptacle 14 is fabricated from an elastomeric material so that a seal is formed between the flange portion 48 and the collar 52 when the cover 32 is attached to the collar 52.

The collar 52 may be fabricated from a hard material (e.g., plastic) that is not deformable like the receptacle 14. The collar 52, as stated above, has threads 60 that mate with internal threads 62 (see FIG. 5) of the cover 32. A height 64 (see FIG. 2) of the collar 52 may be sized to a height of the neck portion 42 so that the collar 52 does not deform the receptacle 14 when mounted thereto. The collar 52 may additionally have finger grooves 66 around a circumference of the collar 52 to help the user to screw or unscrew the cover 32 from the collar 52 especially when the reusable food pouch 10 is wet and slippery. Additionally, the collar 52 may have a tab 68 with a through hole 70 so that the user can attach a loop to the reusable food pouch 10.

Figures 5, 6, 7:
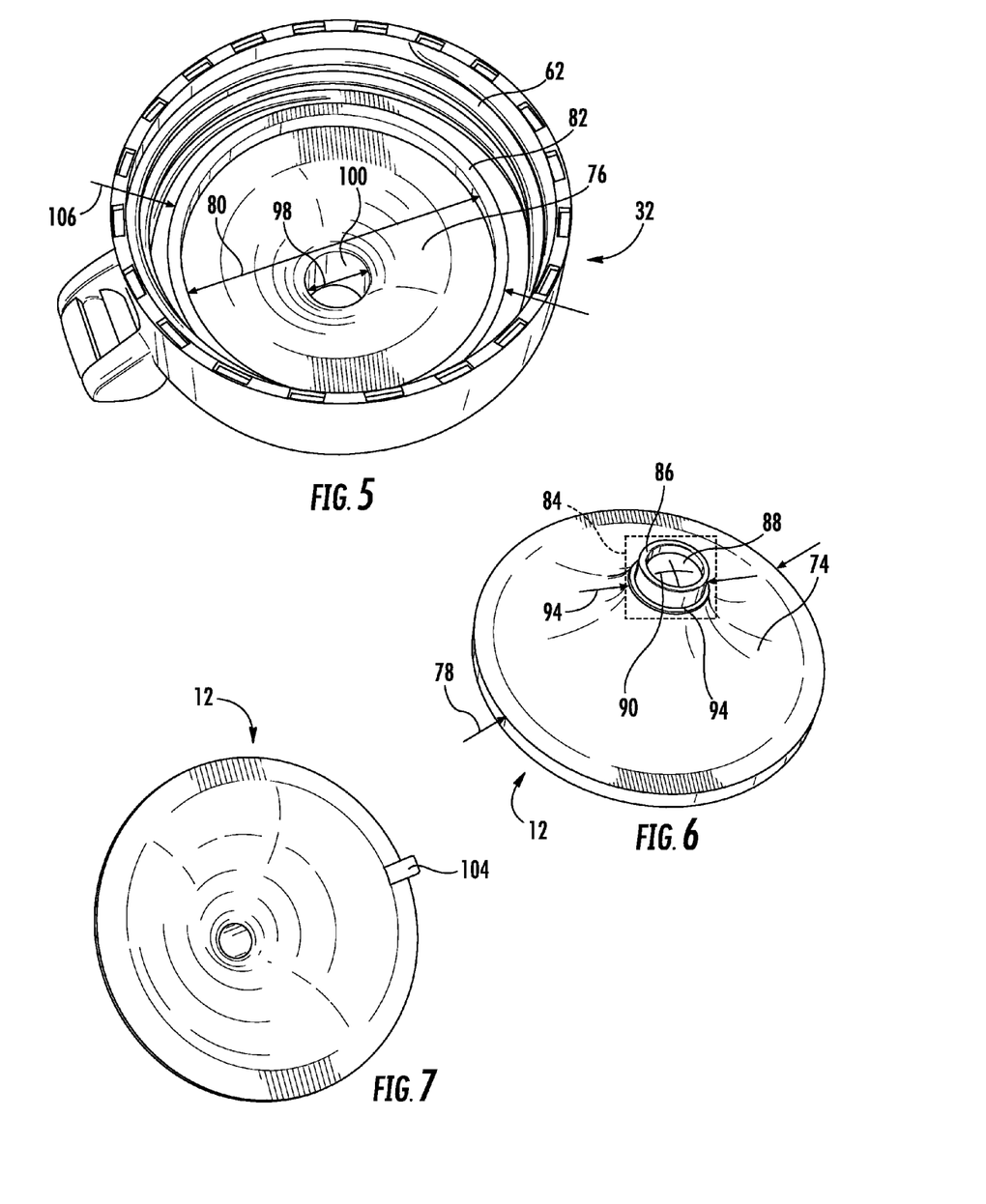
FIG. 5 is a bottom perspective view of a cover of the reusable food pouch shown in FIG. 1.
FIG. 6 is a top perspective view of a one-way valve of the reusable food pouch shown in FIG. 1.
FIG. 7 is a bottom perspective view of the one-way valve shown in FIG. 6.
Figure 8:
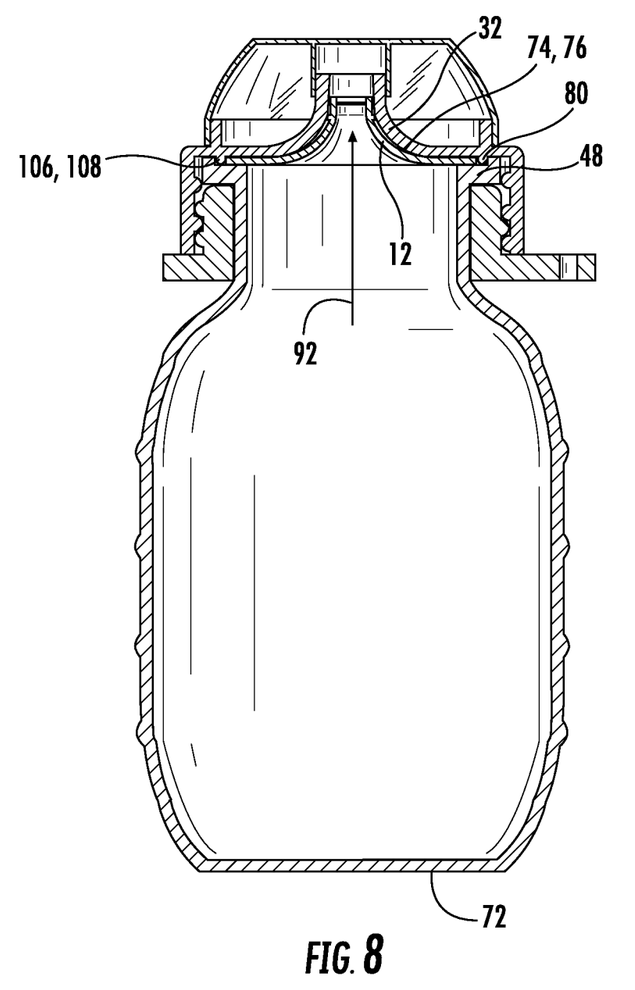
FIG. 8 is a cross-sectional view of the reusable food pouch shown in FIG. 1.

After the receptacle 14 is assembled onto the collar 52, the one-way valve 12 may be mounted to the underside of the cover 32 (see FIGS. 5 and 6). The one-way valve 12 has an upper surface 74 which mates with an undersurface 76 of the cover 32. The upper surface 74 of the one-way valve 12 is sized and configured to be a mirror image of the undersurface 76 of the cover 32. This is more clearly shown in FIG. 8. Accordingly, a liquid tight seal is formed between the surfaces 74, 76 of the one-way valve 12 and the cover 32. The one-way valve 12 additionally has an outer diameter 78 which is equal to about an inner diameter of a flange 82 of the cover 32. As shown in FIG. 8, the one-way valve 12 fits snugly within the flange 80.

The one-way valve 12 additionally has a valving mechanism 84 which extends straight upward from the upper surface 74 as a cylindrical wall 86. A membrane 88 is recessed within the cylindrical wall 86 and has a cross slit 90. The membrane 88 may have a slightly upwardly bowed configuration so that fluid can pass through the cross slit 90 in the direction 92 shown in FIG. 8 and does not permit fluid to flow back into the receptacle 14 through the cross slit 90 when the one-way valve 12 is inserted into the reusable food pouch 10. The one-way valve 12 additionally has a rib 94 that extends outward from the cylindrical wall 86 of the valving mechanism 84. The rib 94 presses against the cover 32 when the one-way valve 12 is mounted to the cover 32, as shown in FIG. 8. The rib 94 may have an outer diameter 96 which is slightly greater than an inner diameter 98 of the mating surface 100 on the cover 32. By pressing the cylindrical wall 86 slightly inward, this may create pressure at the cross slits 90 and along with the upward bowed configuration of the membrane 88 and further urge the cross slits 90 to remain closed to prevent air from reentering the receptacle 14 but allowing air to proceed out of the cross slits 90. Additionally, the rib 94 may also secure the one way valve 12 in the cover to mitigate the one way valve 12 from falling out during assembly or disassembly.

With the one-way valve 12 mounted to the cover 32 and the receptacle 14 mounted to the collar 52, the threads 62 of the cover 32 are threadably engaged to the threads 60 of the collar 52. When the cover 32 is cinched onto the collar 52, the one-way valve 12 and the flange portion 48 are compressed between the cover 32 and the collar 52. In particular, the upper surface 54 of the collar 52 has a thickness 102 larger than the flange 80 of the cover 32 and capable of pressing on the one-way valve 12 in order to form a liquid tight seal therebetween.

Moreover, the outer diameter 106 (see FIG. 5) of the flange 82 is about equal to an inner diameter 108 (see FIG. 2) of the flange portion 48 which protrudes upwardly. This is also illustrated in FIG. 8.

To disassemble the reusable food pouch 10, the cover 32 is unthreaded from the collar 52. The receptacle 14 being deformable is pulled out of the collar 52. Additionally, the one-way valve 12 is removed from the cover 32. To assist the user in removing the one-way valve 12, the one-way valve 12 may have a pull tab 104 on the bottom of the one-way valve 12. The one-way valve 12 may be fabricated from a elastomeric material including but not limited to silicone material, plastic material and other materials known in the art or developed in the future. The one-way valve 12 is preferably resilient in that the one-way valve 12 will spring back to its non-biased state. More particularly, the membrane 88 is resiliently deformable in order to allow fluid to pass through the cross slit 90 when pressure is applied to the side walls 18 of the receptacle 14 and to prevent air from entering through the cross slit 90 by traversing the cross slits 90 back to its original configuration.

Figure 1:
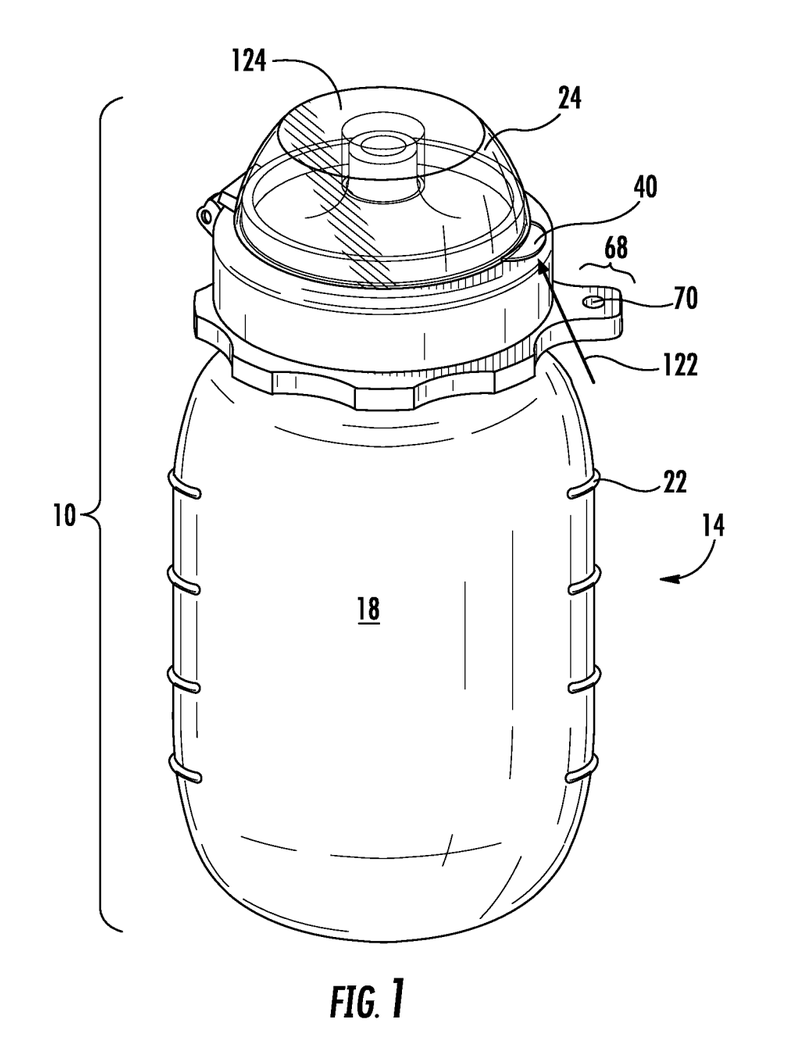
FIG. 1 is a perspective view of a reusable food pouch.

As noted above, the cover 32 may also have a lid 24 which is pivotally attached to the cover 32 with a hinging mechanism 34. In the opened position, as shown in FIG. 4 the user can consume the food product within the receptacle 14 by sucking the food product out of the spout 16 or by depressing the side walls 18 as shown in FIG. 3. When the lid 24 is closed as shown in FIG. 1, the spout 16 is sealed so that the food product within the receptacle 14 cannot leak out of the reusable food pouch 10 even if compressive pressure is applied to the side walls 18.

The lid 24, as discussed above, may be operative to seal the spout 16. To this end, the lid 24 may have a sealing mechanism 110 formed on the underside of the lid 24 so that the ceiling mechanism 110 engages the spout 16 when the lid 24 is traversed to the closed position. The sealing mechanism 110 may be a cylindrical wall 112 that is sized and configured to press against the spout 16 in order to provide a fluid tight seal therebetween, namely, between the cylindrical wall 112 and the spout 16. To this end, an inner diameter 114 of the cylindrical wall 112 may be equal to an outer diameter 116 of the spout 16. The contact between the cylindrical wall 112 and the spout 16 may form the fluid tight seal. Moreover, the lid 24 may have a lower surface 118 which may optionally engage the upper surface 120 of the spout 16 to further form a liquid tight seal to prevent fluid from flowing out of the spout 16 when the lid 24 is in the closed position.

The lid 24 may remain in the closed position, as discussed above, with the protrusion 38 that interferes with the upper edge of the flange 36 of the cover 32. In order to traverse the lid 24 to the opened position, the user may press upward 122 (see FIG. 1) to traverse the lid 24 to the opened position. The lid 24 may also have a flat top 124 to allow the reusable food pouch to be inverted upside down if desired. Both the cover 32 and lid 24 may be fabricated from a hard material such as plastic.

The flowable food product and whether the one way valve is used in the pouch have been described in part by its viscosity. If the viscosity is low or similar to that of water, then the pouch has been described so that the one way valve is utilized as part of the reusable food pouch. Conversely, if the viscosity is high or similar to that of applesauce, then the pouch has been described so that the one way valve is not utilized as part of the reusable food pouch. More particularly, the one way valve may be removed from the pouch and stored when the flowable food product being dispensed has a viscosity of less than about 5 Pa-s. Conversely, the one way valve may be used with the pouch when the flowable food product being dispensed has a viscosity of greater than 5 Pa-s.

The above description is given by way of example, and not limitation. Given the above disclosure, one skilled in the art could devise variations that are within the scope and spirit of the invention disclosed herein, including various ways of forming the lid 24. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A container for holding flowable food product, the container comprising:
    a deformable receptacle having a cavity for holding the flowable food product, the deformable receptacle having a closed bottom and an opening at an upper end of the deformable receptacle;
    a rigid cover attachable to the deformable receptacle, the rigid cover having a reduced narrow spout for forcing the flowable food product out of the spout and into a mouth of a person;
    a valve fabricated from a flexible material, the valve being removably disposable between the deformable receptacle and the rigid cover, the valve having an opening aligned to the spout when the valve is disposed between the deformable receptacle and the rigid cover for forcing the flowable food product out of the opening and the spout, the valve defining an upper surface, the upper surface of the valve mates with an interior surface of the rigid cover at the reduced narrow spout of the rigid cover to form a liquid tight seal with the upper surface of the valve and the interior surface of the rigid cover;
    wherein the valve is disposed between the deformable receptacle and the rigid cover for flowing flowable food products through the opening and the spout of the rigid cover and the valve is removed from between the deformable receptacle and the rigid cover for flowing flowable food products with solid materials mixed with the flowable food products through the spout of the rigid cover.

2. The container of claim 1 wherein the interior surface of the rigid cover has a funnel shape that leads to the spout having a straight cylindrical configuration.

3. The container of claim 2 wherein the valve is a one way valve which has the upper surface, the upper surface has a configuration identical to the interior surface of the rigid cover.

4. The container of claim 2 wherein the valve is a one way valve which has an outwardly protruding rib that engages the interior surface of the rigid cover at the spout.

5. The container of claim 2 wherein the rigid cover has a downwardly protruding lip extending from the interior surface circumscribing the valve when the valve is seated on the interior surface of the cover.

6. The container of claim 5 wherein the valve has a lower surface and a pull tab extends below the lower surface in order to remove the valve from the cover when the valve is seated on the cover.

7. The container of claim 1 wherein the rigid cover has a lid that engages with the spout to stop flow of the flowable food product through the spout when the lid is engaged to the spout and to allow flow of the flowable food product through the spout when the lid is disengaged from the spout.

8. The container of claim 1 wherein the valve is a one way valve having is a cross slit formed in a membrane.

9. A method of providing a flowable food product to a toddler, the method comprising the steps of:
    providing a receptacle, a collar, a rigid cover and a one way valve with an opening, the rigid cover having a spout which is alignable to the opening of the one way valve, an upper surface of the one way valve mates with an interior surface of the rigid cover, the toddler sucks out the flowable food product disposed within the receptacle through the opening of the one way valve and the spout, the collar and rigid cover capable of forming a seal with a flange portion of the receptacle so that a liquid tight seal is formed between the rigid cover, flange portion of the receptacle and the collar;
    inserting the flange portion of the receptacle through the collar;
    filling the receptacle with a fluid having a viscosity about equal to a viscosity of water;
    disposing the one way valve between the flange portion of the receptacle and the rigid cover so that the flowable food product does not flow out of the spout unless sidewalls of the receptacle are being compressed or suction is formed at the spout;
    aligning the opening of the one way valve and the spout so that flowable food product flows out of the opening of the one way valve and the spout;
    fastening the rigid cover on the collar so as to compress the flange portion of the receptacle between the rigid cover and the collar to form the seal with the flange portion.

10. The method of claim 9 wherein the method further comprises the step of flowing flowable food product out of the receptacle and through the opening of the one way valve and the spout.

11. A method of providing a flowable food product to a toddler, the method comprising the steps of:
    providing a receptacle, a collar, a rigid cover and a one way valve with an opening, the rigid cover having a spout which is alignable to the opening of the one way valve, an upper surface of the one way valve mates with an interior surface of the rigid cover, the toddler sucks out the flowable food product disposed within the receptacle through the opening of the one way valve and the spout, the collar and rigid cover capable of forming a seal with a flange portion of the receptacle so that a liquid tight seal is formed between the rigid cover, flange portion of the receptacle and the collar;

inserting the flange portion of the receptacle through the collar;

filling the receptacle with a fluid having a viscosity about equal to a viscosity of a puree of vegetable and fruits;

removing the one way valve between the flange portion of the receptacle and the rigid cover so that the flowable food product does flow out of the spout without pressure on sidewalls of the receptacle;

fastening the rigid cover on the collar so as to compress the flange portion of the receptacle between the rigid cover and the collar to form the seal with the flange portion.

12. The method of claim 11 wherein the method further comprises the step of flowing flowable food product out of the receptacle and through the spout.

* * * * *